(12) United States Patent
Zalewski

(10) Patent No.: US 9,050,990 B1
(45) Date of Patent: Jun. 9, 2015

(54) CART FOR HIGH PRESSURE GAS TANKS

(71) Applicant: Erik M. Zalewski, Miller Place, NY (US)

(72) Inventor: Erik M. Zalewski, Miller Place, NY (US)

( * ) Notice: Subject to any disclaimer, the term of this patent is extended or adjusted under 35 U.S.C. 154(b) by 0 days.

(21) Appl. No.: 14/098,614

(22) Filed: Dec. 6, 2013

(51) Int. Cl.
*B62B 3/02* (2006.01)
*B62B 1/10* (2006.01)

(52) U.S. Cl.
CPC ........................................ *B62B 1/10* (2013.01)

(58) Field of Classification Search
CPC .. B62B 2202/022; B62B 1/264; B62B 3/104; F17C 2205/0161; F17C 13/085; F17C 2205/013; B23K 9/327; B25H 1/12
USPC .......... 280/47.131, 47.17, 47.19, 47.2, 47.24, 280/47.26, 63, 79.11, 79.2, 79.6; 312/249.1, 249.8
See application file for complete search history.

(56) References Cited

U.S. PATENT DOCUMENTS

| | | | |
|---|---|---|---|
| 3,081,542 A | 3/1963 | Sherfey | |
| 4,160,323 A | 7/1979 | Tracy | |
| D263,995 S | 4/1982 | Steele | |
| 4,344,660 A * | 8/1982 | Molnar et al. | 312/249.13 |
| 4,432,470 A * | 2/1984 | Sopha | 222/135 |
| 4,625,949 A * | 12/1986 | Walker | 266/48 |
| 4,790,610 A | 12/1988 | Welch et al. | |
| D304,075 S | 10/1989 | Welch | |
| 4,875,696 A | 10/1989 | Welch et al. | |
| 5,071,148 A * | 12/1991 | Salvucci, Sr. | 280/47.24 |
| 5,074,571 A * | 12/1991 | Reese | 280/47.19 |
| 5,673,984 A | 10/1997 | Insalaco et al. | |
| 6,036,203 A * | 3/2000 | Tyus et al. | 280/47.26 |
| 6,059,127 A * | 5/2000 | Bennett | 211/85.18 |
| D443,744 S * | 6/2001 | Intravatola | D34/12 |
| 6,992,266 B1 * | 1/2006 | Di Novo et al. | 219/137.9 |
| 7,188,846 B2 | 3/2007 | Deavila | |
| 7,252,297 B1 * | 8/2007 | Barritt et al. | 280/47.26 |
| 2011/0223002 A1 * | 9/2011 | Baugh | 414/800 |
| 2012/0007323 A1 | 1/2012 | Janick et al. | |
| 2013/0106073 A1 * | 5/2013 | Gamard et al. | 280/79.2 |

\* cited by examiner

*Primary Examiner* — John Walters
*Assistant Examiner* — Brian Swenson
(74) *Attorney, Agent, or Firm* — Richard L. Miller

(57) ABSTRACT

A cart that multiply positions at least one high pressure gas tank, and stores equipment at least associated therewith. The cart includes a frame and storage cabinets. The frame multiply positions the at least one high pressure gas tank. The storage cabinets are affixed to the frame, and store the equipment at least associated with the at least one high pressure gas tank.

45 Claims, 6 Drawing Sheets

CART FOR HIGH PRESSURE GAS TANKS

BACKGROUND OF THE INVENTION

1. Field of the Invention

The present invention relates to a cart, and more particularly, a cart for high pressure gas tanks.

2. Description of the Prior Art

Numerous innovations for carts have been provided in the prior art that will be described. Even though these innovations may be suitable for the specific individual purposes to which they address, however, they differ from the present invention.

A FIRST EXAMPLE, U.S. Pat. No. 3,081,542, Issued on Mar. 19, 1963, to Sherfey teaches power driven equipment required for the practice of dentistry and surgery when such utilities as electricity, compressed air, water under pressure, and fuel gas are not readily available at the point of use.

A SECOND EXAMPLE, U.S. Pat. No. 4,160,323, Issued on Jul. 10, 1979, to Tracy teaches a mobile dental unit that provides physical support for dental operations during a long period of time when the operations are conducted in remote or out-of-office areas. A wheeled cabinet defines a lower compartment containing a source of compressed air, a vacuum chamber, and a vacuum pump. The upper compartment contains a storage space, a pressurizable water reservoir, and an amalgamator. The source of compressed air illustrated here is a tank of the variety offered for use in self-contained underwater breathing apparatus. This source tank provides air for direct use in dental operations and also operates the pneumatic drives of dental handpieces. A patient support structure can be associated with the unit to permit an infirm patient to be treated in a supine position.

A THIRD EXAMPLE, U.S. Pat. No. 4,790,610, Issued on Dec. 13, 1988, to Welch, et al. teaches a medical emergency crash cart that includes a housing having a top formed with a recessed tray for storing instruments, supplies, and the like, and at least one side formed with an opening. A transparent cover selectably covers the tray but provides visual access to its contents. A removable door encloses the opening. At least one storage compartment is mounted on another side of the housing and is pivotable between open and closed positions. A single latch mechanism simultaneously locks the cover in position covering the tray, the door in position enclosing the opening in the housing, and the compartment in its closed position.

A FOURTH EXAMPLE, U.S. Pat. No. 4,875,696, Issued on Oct. 24, 1989, to Welch, et al. teaches a caster direction-locking mechanism for a mobile cart that includes four casters supporting it for rolling movement. Each caster has a wheel rotatable about a horizontal axis and is mounted with the cart for swiveling movement about a generally vertical axis. The caster direction-locking mechanism selectably locks two adjacent casters against such swiveling movement and with the horizontal axes thereof in generally mutually parallel relation. A handle is mounted on the cart for steering it and an actuator is associated with the handle for actuating the caster direction-locking mechanism to selectably lock and unlock the two casters against swiveling movement.

A FIFTH EXAMPLE, U.S. Pat. No. 5,673,984, Issued on Oct. 7, 1997, to Insalaco, et al. teaches a cart for transporting materials along a floor, which has a base positioned parallel to the floor. Positioned above the base is a rectangular cover having a first side edge, a second side edge, and a back edge defining three sides of a rectangle. A first side support, a second side support, and a back support each extend from the base to the cover. Four vertical supports extend from the base to contact the cover at four points substantially aligned with a first diagonal of the rectangle.

A SIXTH EXAMPLE, U.S. Pat. No. 7,188,846, Issued on Mar. 13, 2007, to Deavila teaches a mobile safety compliance apparatus including a shell with a plurality of open compartments closed by doors, a self-contained water supply system, and a waste water collection system. The water supply system provides drinking water, tepid hand washing water, and water for a stowable eyewash hingedly attached to the shell. The waste water collection system collects water from the eyewash and a sink mounted in a recessed area of the shell. Doors are removable and have features to facilitate alternative uses, such as a stretcher or a freestanding table. A stowable seat and table are hingedly attached to the shell. The apparatus includes an electrical system with battery backup for powering lights, water heating, refrigeration devices, and electronic communication equipment that may be mounted on the shell. The apparatus includes wheels to facilitate its movement and anchor points to secure it to the ground.

A SEVENTH EXAMPLE, U.S. patent Office Document No. D263,995, Issued on Apr. 20, 1982, to Steele teaches the ornamental design for a crash cart for hospitals.

AN EIGHTH EXAMPLE, patent Office Document No. D304,075, Issued on Oct. 17, 1989, to Welch teaches the ornamental design for an emergency medical crash cart.

A NINTH EXAMPLE, U.S. Patent Office Document No. 20120007323, Published on Jan. 12, 2012, to Janick, et al. teaches a utility cart including an auxiliary swivel caster wheel assembly, a locking mechanism, and a trigger mechanism for causing the locking mechanism to releasably lock the auxiliary swivel caster wheel assembly. The auxiliary swivel caster wheel assembly is unlocked to enable the auxiliary swivel caster wheel to rotate about a vertical axis for improved maneuverability in small areas, and is locked to hold the auxiliary swivel caster wheel in a predetermined position for improved steering as the cart is moved from one location to another. The trigger mechanism is disposed on a steering handle to enable dynamic actuation of the locking mechanism while the cart is in motion.

It is apparent now that numerous innovations for carts have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a cart for high pressure gas tanks that avoids the disadvantages of the prior art.

ANOTHER OBJECT of the present invention is to provide a cart for high pressure gas tanks that is simple and inexpensive to manufacture.

STILL ANOTHER OBJECT of the present invention is to provide a cart for high pressure gas tanks that is simple to use.

BRIEFLY STATED, STILL YET ANOTHER OBJECT of the present invention is to provide a cart that multiply positions at least one high pressure gas tank and stores equipment at least associated therewith. The cart includes a frame and storage cabinets. The frame multiply positions the at least one high pressure gas tank. The storage cabinets are affixed to the frame, and store the equipment at least associated with the at least one high pressure gas tank.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
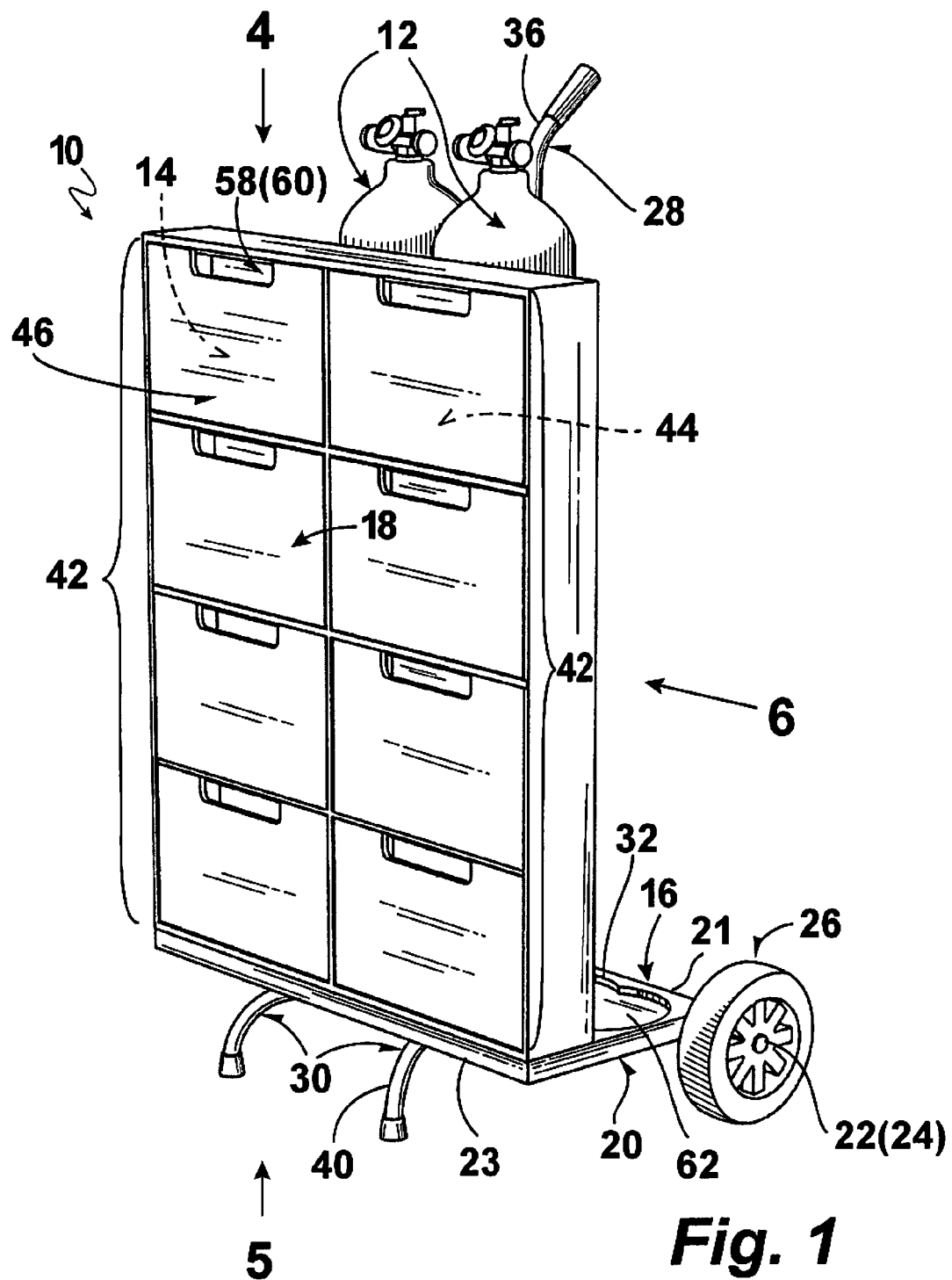
FIG. 1 is a three quarter front, left side top diagrammatic perspective view of the cart per se illustrated with two gas cylinders installed thereon.
Figure 2:
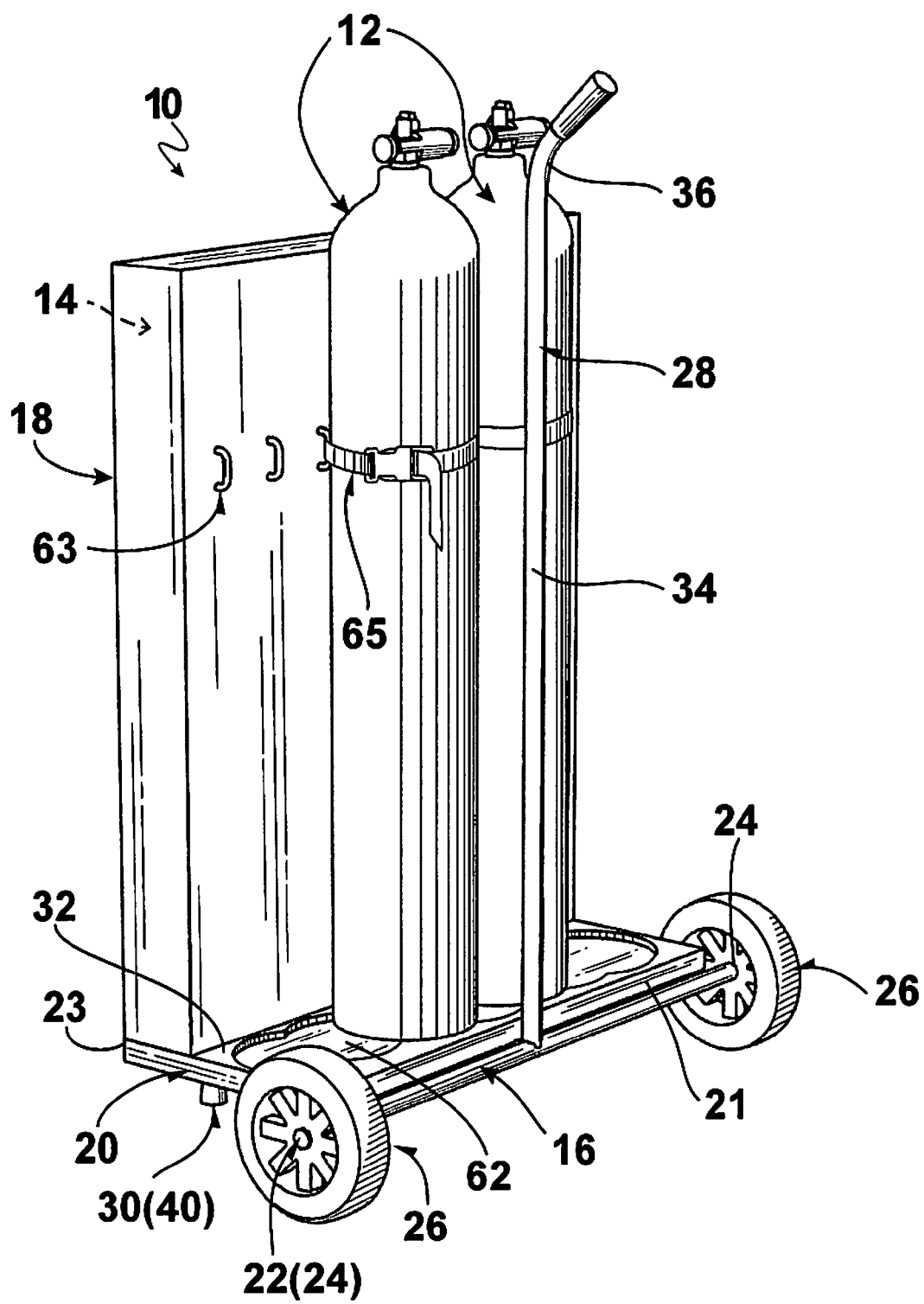
FIG. 2 is a three quarter rear, left side top diagrammatic perspective view of the cart per se illustrated with two gas cylinders installed thereon.
Figure 3:
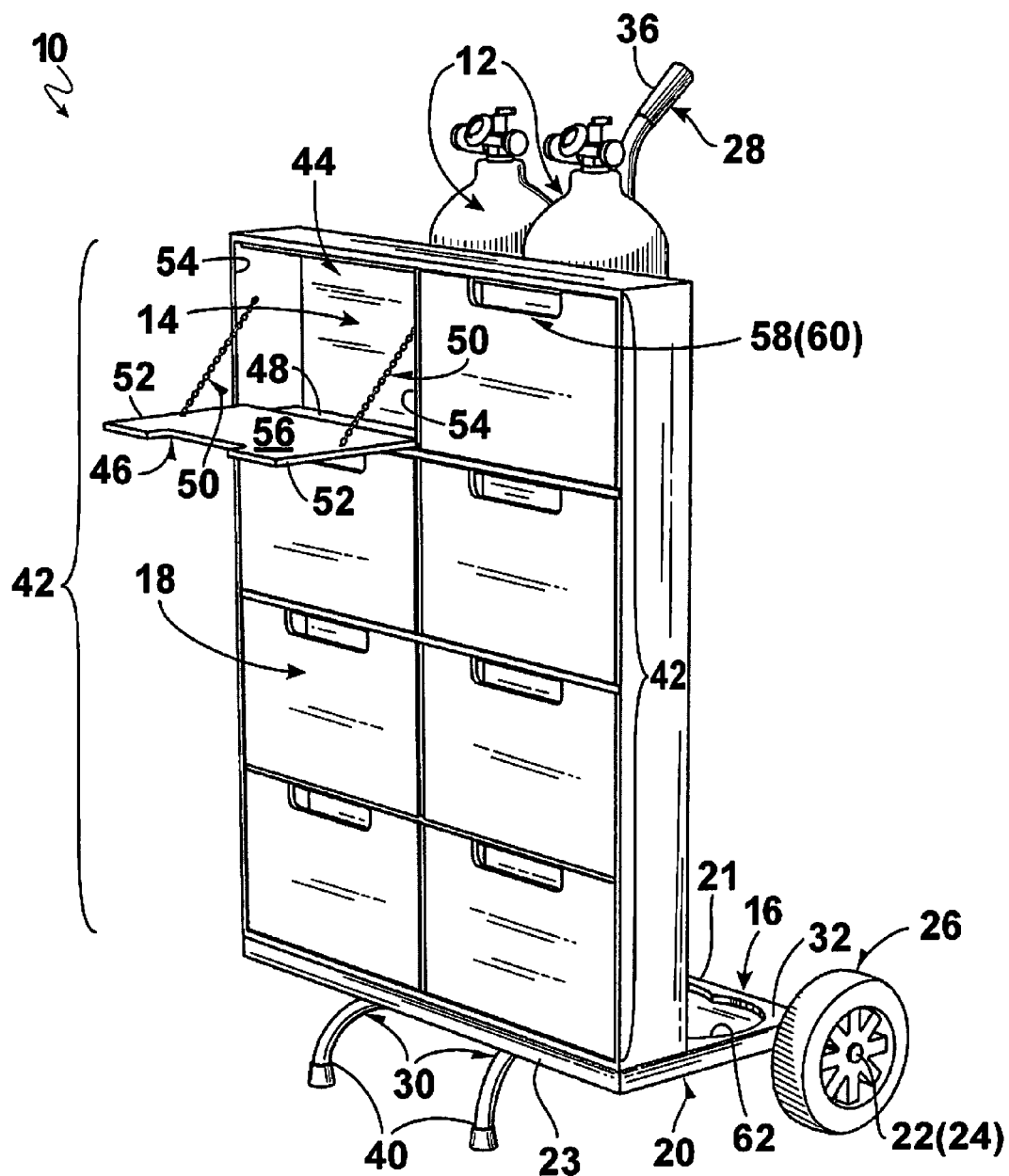
FIG. 3 is a three quarter front, left side top diagrammatic perspective view of the cart per se illustrated with one of several compartment doors in a caddy portion in an open position.
Figure 4:
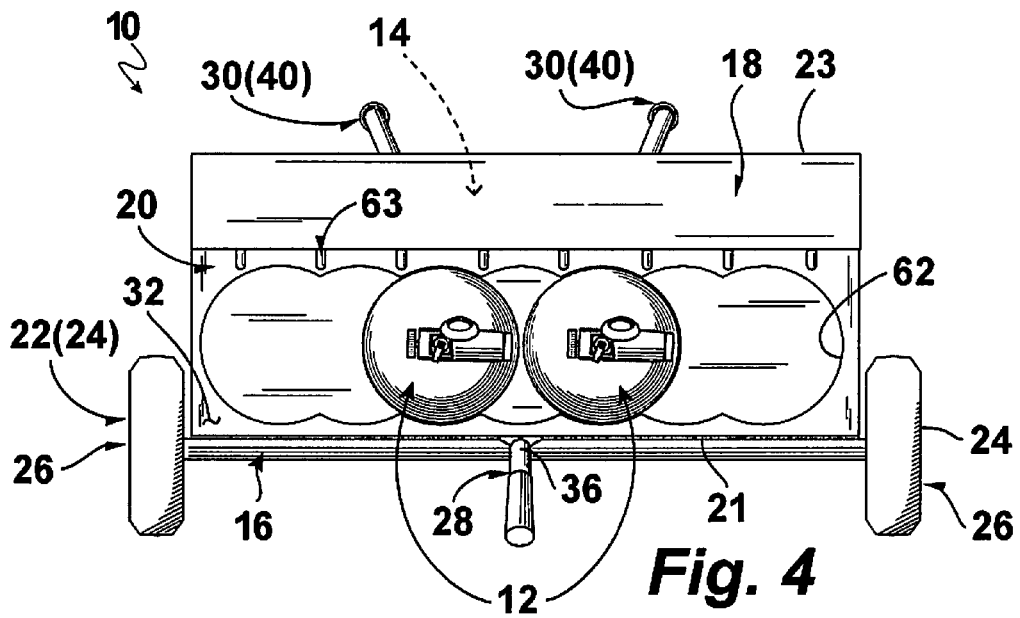
FIG. 4 is a top plan view taken in the direction of arrow 4 in FIG. 1.
Figure 5:
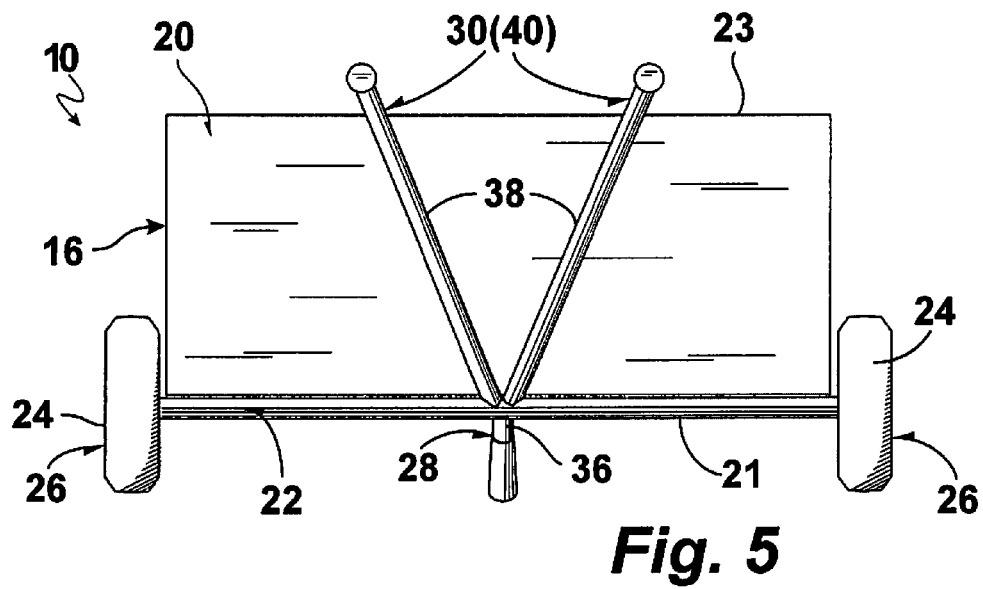
FIG. 5 is a bottom plan view taken in the direction of arrow 5 in FIG. 1.
Figure 6:
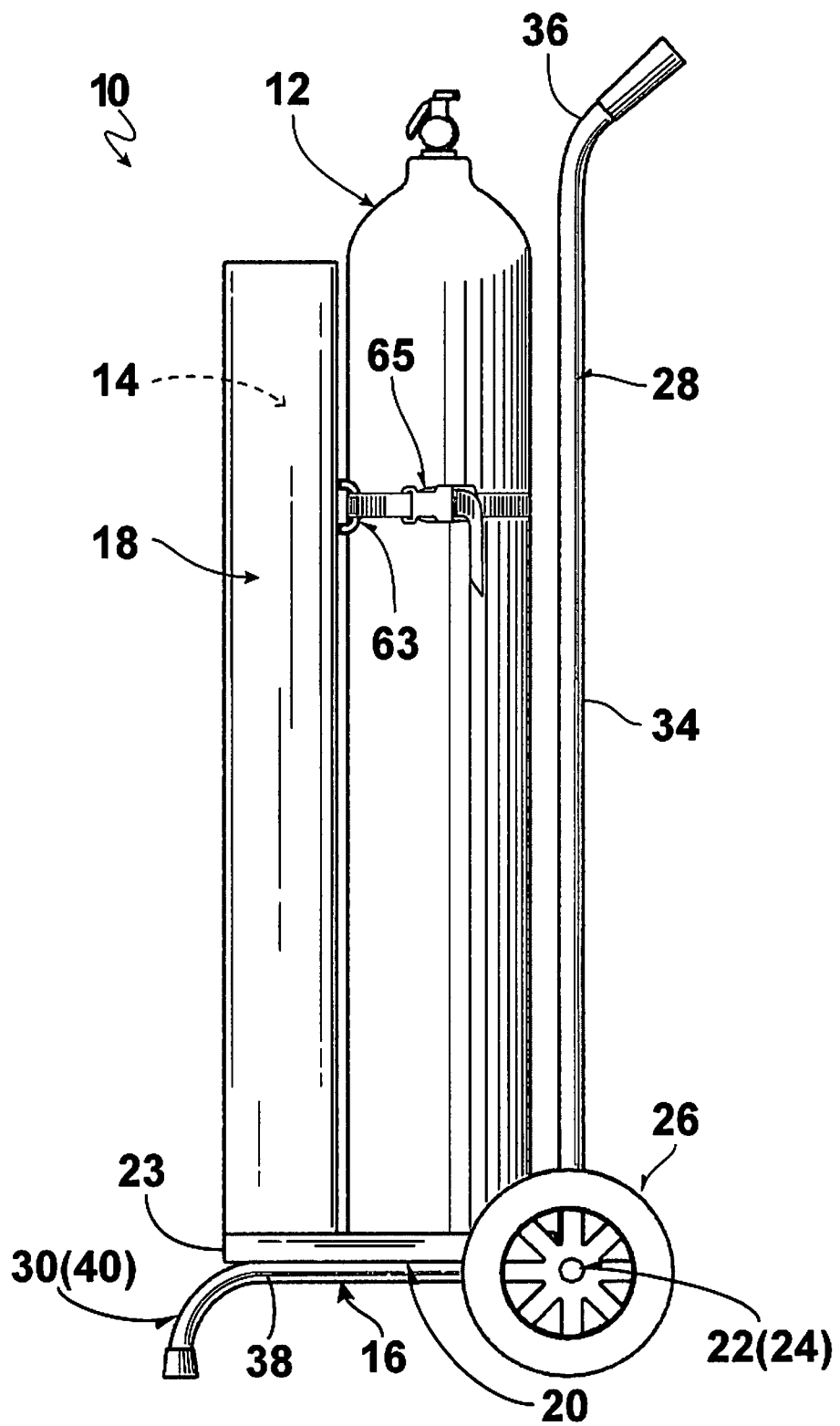
FIG. 6 is a left side elevational view taken in the direction of arrow 6 in FIG. 1.

A MARSHALING OF REFERENCE NUMERALS UTILIZED IN THE DRAWING 10 cart of embodiments of present invention for multiple positioning of at least one high pressure gas tank 12 and for storing at least equipment 14 associated therewith
12 at least one high pressure gas tank
14 at least equipment associated with the at least one high pressure gas tank 12
16 frame for multiple positioning of at least one high pressure gas tank 12
18 storage cabinets for storing equipment 14 at least associated with at least one high pressure gas tank 12
20 base of frame 16
21 rearmost edge of base 20 of frame 16
22 axle of frame 16
23 forwardmost edge of base 20 of frame 16
24 pair of free ends of axle 22 of frame 16
26 pair of wheels of frame 16
28 handle of frame 16
30 feet of frame 16
32 upper surface of base 20 of frame 16
34 straight portion of handle 28 of frame 16 for extending upwardly to above at least one high pressure gas tank 12
36 rearwardly curved portion of handle 28 of frame 16
38 straight portions of feet 30 of frame 16, respectively
40 downwardly curved portions of feet 30 of frame 16, respectively
42 two columns of cabinets of storage cabinets 18
44 storage portion of each cabinet of two columns of cabinets 42 of storage cabinets 18
46 door of each cabinet of two columns of cabinets 42 of storage cabinets 18
48 piano hinge of each cabinet of two columns of cabinets 42 of storage cabinets 18
50 pair of chains of each cabinet of two columns of cabinets 42 of storage cabinets 18
56 supporting surface of each cabinet of two columns of cabinets 42 of storage cabinets 18
58 handle of each cabinet of two columns of cabinets 42 of storage cabinets 18
60 cutout in door 46 of associated cabinet of two columns of cabinets 42 of storage cabinets 18
62 plurality of recesses in upper surface 32 of base 20 of frame 16 for receiving at least one high pressure gas tank 12, respectively
63 eight loops of cabinets 18
64 seven circular-shaped recesses of plurality of recesses 62 in upper surface 32 of base 20 of frame 16 for receiving one to four high pressure gas tanks 12 in twenty-nine different configurations
65 one to five straps of cabinets 18

DETAILED DESCRIPTION OF THE PREFERRED EMBODIMENT

Referring now to the figures, in which like numerals indicate like parts, and particularly to FIG. 1-6, which are, respectively, a three quarter front, left side top diagrammatic perspective view of the cart per se illustrated with two gas cylinders installed thereon, a three quarter rear, left side top diagrammatic perspective view of the cart per se illustrated with two gas cylinders installed thereon, a three quarter front, left side top diagrammatic perspective view of the cart per se illustrated with one of several compartment doors in a caddy portion in an open position, a top plan view taken in the direction of arrow 4 in FIG. 1, a bottom plan view taken in the direction of arrow 5 in FIG. 1, and a left side elevational view taken in the direction of arrow 6 in FIG. 1, the cart of the embodiments of the present invention is shown generally at 10 for multiple positioning of at least one high pressure gas tank 12 and for storing equipment 14 at least associated therewith.

The cart 10 comprises a frame 16 and storage cabinets 18.

The frame 16 is for the multiple positioning of the at least one high pressure gas tank 12. The storage cabinets 18 are affixed to the frame 16, and are for storing the equipment 14 at least associated with the at least one high pressure gas tank 12.

The frame 16 comprises a base 20.

The base 20 of the frame 16 has a rearmost edge 21 and a forwardmost edge 23.

The frame 16 further comprises an axle 22.

The axle 22 of the frame 16 has a pair of free ends 24, extends laterally across the rearmost edge 21 of the base 20 of the frame 16, and is fixedly attached to the base 20 of the frame 16, with the pair of free ends 24 of the axle 22 of the frame 16 extending outboard of the base 20 of the frame 16.

The frame 16 further comprises a pair of wheels 26.

The pair of wheels 26 of the frame 16 are rotatably attached to the pair of free ends 24 of the axle 22 of the frame 16, respectively.

The frame 16 further comprises a handle 28.

The handle 28 of the frame 16 extends upwardly from the axle 22 of the frame 16, midway between the pair of free ends 24 of the axle 22 of the frame 16.

The frame 16 further comprises feet 30.

The feet 30 of the frame 16 extend forwardly from the axle 22 of the frame 16 to past the forwardmost edge 23 of the base 20 of the frame 16.

The base 20 of the frame 16 is rectangular-shaped, and has an upper surface 32. The upper surface 32 of the base 20 of the frame 16 is for having the at least one high pressure gas tank 12 rest thereon.

The axle 22 of the frame 16 is straight, slender, and elongated.

The handle 28 of the frame 16 is slender and elongated.

The handle 28 of the frame 16 extends upwardly from the axle 22 of the frame 16 in a straight portion 34 that terminates in a rearwardly curved portion 36.

The straight portion 34 of the handle 28 of the frame 16 is for extending upwardly to above, so as to clear, the at least one high pressure gas tank 12.

The feet 30 of the frame 16 extend forwardly and jointly from the axle 22 of the frame 16 in straight portions 38 that diverge and terminate in downwardly curved portions 40, respectively.

The downwardly curved portions 40 of the feet 30 of the frame 16 are forward of the forwardmost edge 23 of the base 20 of the frame 16.

The storage cabinets 18 rest on, and extend upwardly from, the upper surface 32 of the base 20 of the frame 16, flush with the forwardmost edge 23 of the base 20 of the frame 16.

The storage cabinets 18 comprise two columns of cabinets 42.

The two columns of cabinets 42 of the storage cabinets 18 are of equal amount, are of equal configuration, are disposed side-by-side, and touch each other.

Each cabinet 42 of the storage cabinets 18 has a storage portion 44 and a door 46.

The door 46 of each cabinet 42 of the storage cabinets 18 is hingedly attached, by a piano hinge 48, to, so as to selectively close, the storage portion 44 of an associated cabinet 42 of the storage cabinets 18.

Each cabinet 42 of the storage cabinets 18 further comprises a pair of chains 50.

The pair of chains 50 of each cabinet 42 of the storage cabinets 18 extend from opposing sides 52 of the door 46 of an associated cabinet 42 of the storage cabinets 18 to opposing sides 54 of the storage portion 44 of the associated cabinet 42 of the storage cabinets 18, respectively, so as to limit pivoting downwardly of the door 46 of the associated cabinet 42 of the storage cabinets 18 to horizontal, and in doing so, allows the door 46 of the associated cabinet 42 of the storage cabinets 18 to function also as a supporting surface 56.

Each cabinet 42 of the storage cabinets 18 further comprises a handle 58.

The handle 58 of each cabinet 42 of the storage cabinets 18 is a cutout 60 in the door 46 of an associated cabinet 42 of the storage cabinets 18.

The upper surface 32 of the base 20 of the frame 16 has a plurality of recesses 62 therein. The plurality of recesses 62 in the upper surface 32 of the base 20 of the frame 16 are for receiving the at least one high pressure gas tank 12, respectively.

The storage cabinets 18 further comprise eight loops 63 extending rearwardly therefrom.

The eight loops 63 of the storage cabinets 18 are spaced-apart an amount that allows each adjacent pair of loops 63 of the storage cabinets 18 to straddle a respective high pressure gas tank 12.

The storage cabinets 18 further comprise one to five straps 65.

Each of the one to five straps 65 of the storage cabinets 18 extends through an adjacent pair of loops 63 of the storage cabinets 18 and captures an associated high pressure gas tank 12.

Figure 7:
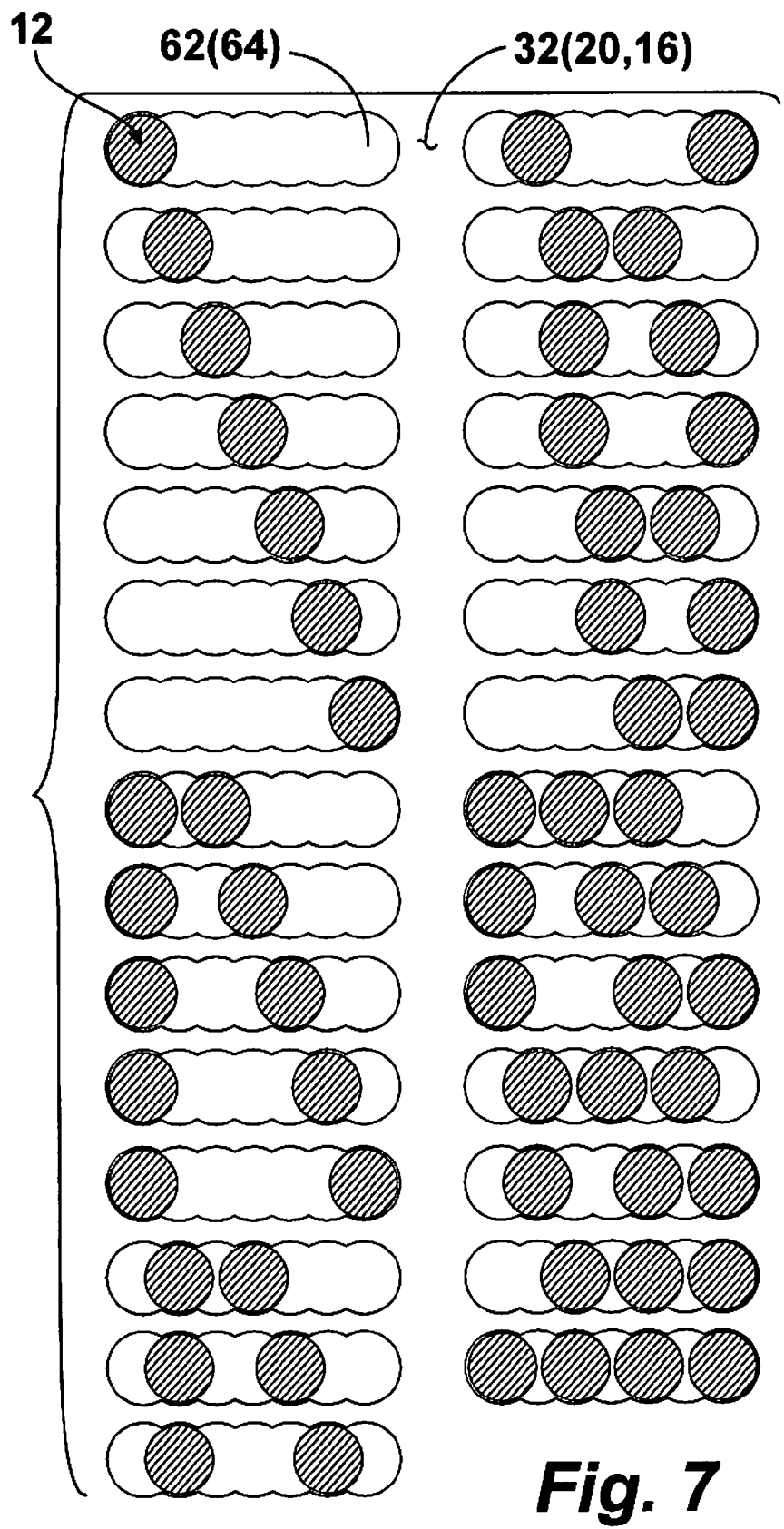
FIG. 7 diagrammatic pictorial chart showing various combination for installing gas cylinders on the cart.

The configuration of the plurality of recesses 62 in the upper surface 32 of the base 20 of the frame 16 can best be seen in FIG. 7, which is diagrammatic pictorial chart showing various combination for installing gas cylinders on the cart, and as such, will be discussed with reference thereto.

The plurality of recesses 62 in the upper surface 32 of the base 20 of the frame 16 comprise seven circular-shaped recesses 64.

The seven circular-shaped recesses 64 of the plurality of recesses 62 in the upper surface 32 of the base 20 of the frame 16 overlap adjacent circular-shaped recesses 64 of the plurality of recesses 62 in the upper surface 32 of the base 20 of the frame 16 by 50% so as to receive one to four high pressure gas tanks 12 in twenty-nine different configurations.

It will be understood that each of the elements described above, or two or more together, may also find a useful application in other types of constructions differing from the types described above.

While the invention has been illustrated and described as embodiments of a cart for high pressure gas tanks, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A cart for multiple positioning of at least one high pressure gas tank and for storing equipment at least associated therewith, comprising:
   a) a frame; and
   b) storage cabinets;
   wherein said frame is for the multiple positioning of the at least one high pressure gas tank;
   wherein said storage cabinets are affixed to said frame;
   wherein said storage cabinets are for storing the equipment at least associated with the at least one high pressure gas tank;
   wherein said frame comprises a base;
   wherein said base of said frame has an upper surface;
   wherein said upper surface of said base of said frame is for having the at least one high pressure gas tank rest thereon;
   wherein said upper surface of said base of said frame has a plurality of recesses therein;
   wherein said plurality of recesses in said upper surface of said base of said frame are for receiving the at least one high pressure gas tank, respectively; and
   wherein said plurality of recesses in said upper surface of said base of said frame comprise seven circular-shaped recesses.

2. The cart of claim 1, wherein said base of said frame has a rearmost edge.

3. The cart of claim 2, wherein said base of said frame has a forwardmost edge.

4. The cart of claim 3, wherein said frame comprises an axle.

5. The cart of claim 4, wherein said axle of said frame has a pair of free ends.

6. The cart of claim 5, wherein said pair of free ends of said axle of said frame extend outboard of said base of said frame.

7. The cart of claim 5, wherein said frame comprises a pair of wheels.

8. The cart of claim 7, wherein said pair of wheels of said frame are rotatably attached to said pair of free ends of said axle of said frame, respectively.

9. The cart of claim 5, wherein said frame comprises a handle.

10. The cart of claim 9, wherein said handle of said frame extends upwardly from said axle of said frame.

11. The cart of claim 9, wherein said handle of said frame is slender.

12. The cart of claim 9, wherein said handle of said frame is elongated.

13. The cart of claim 9, wherein said handle of said frame extends upwardly from said axle of said frame in a straight portion that terminates in a rearwardly curved portion; and
wherein said straight portion of said handle of said frame is for extending upwardly to above, so as to clear, the at least one high pressure gas tank.

14. The cart of claim 5, wherein said handle of said frame is disposed midway between said pair of free ends of said axle of said frame.

15. The cart of claim 4, wherein said axle of said frame extends laterally across said rearmost edge of said base of said frame.

16. The cart of claim 4, wherein said axle of said frame is fixedly attached to said base of said frame.

17. The cart of claim 4, wherein said frame comprises feet.

18. The cart of claim 17, wherein said feet of said frame extend forwardly from said axle of said frame to past said forwardmost edge of said base of said frame.

19. The cart of claim 17, wherein said feet of said frame extend forwardly and jointly from said axle of said frame in straight portions that diverge and terminate in downwardly curved portions, respectively.

20. The cart of claim 19, wherein said downwardly curved portions of said feet of said frame are forward of said forwardmost edge of said base of said frame.

21. The cart of claim 4, wherein said axle of said frame is straight.

22. The cart of claim 4, wherein said axle of said frame is slender.

23. The cart of claim 4, wherein said axle of said frame is elongated.

24. The cart of claim 3, wherein said storage cabinets are flush with said forwardmost edge of said base of said frame.

25. The cart of claim 1, wherein said base of said frame is rectangular-shaped.

26. The cart of claim 1, wherein said storage cabinets rest on said upper surface of said base of said frame.

27. The cart of claim 1, wherein said storage cabinets extend upwardly from said upper surface of said base of said frame.

28. The cart of claim 1, wherein said storage cabinets comprise two columns of cabinets.

29. The cart of claim 28, wherein said two columns of cabinets of said storage cabinets are of equal amount.

30. The cart of claim 28, wherein said two columns of cabinets of said storage cabinets are of equal configuration.

31. The cart of claim 28, wherein said two columns of cabinets of said storage cabinets are disposed side-by-side.

32. The cart of claim 28, wherein said two columns of cabinets of said storage cabinets touch each other.

33. The cart of claim 28, wherein each cabinet of said storage cabinets has a storage portion.

34. The cart of claim 33, wherein each cabinet of said storage cabinets has a door.

35. The cart of claim 34, wherein said door of each cabinet of said storage cabinets is hingedly attached to, so as to selectively close, said storage portion of an associated cabinet of said storage cabinets.

36. The cart of claim 34, wherein said door of each cabinet of said storage cabinets is hingedly attached by a piano hinge to, so as to selectively close, said storage portion of an associated cabinet of said storage cabinets.

37. The cart of claim 34, wherein each cabinet of said storage cabinets comprises a pair of chains.

38. The cart of claim 37, wherein said pair of chains of each cabinet of said storage cabinets extend from opposing sides of said door of an associated cabinet of said storage cabinets to opposing sides of said storage portion of said associated cabinet of said storage cabinets, respectively, so as to limit pivoting downwardly of said door of said associated cabinet of said storage cabinets to horizontal, and in doing so, allows said door of said associated cabinet of said storage cabinets to function also as a supporting surface.

39. The cart of claim 34, wherein each cabinet of said storage cabinets comprises a handle.

40. The cart of claim 39, wherein said handle of each cabinet of said storage cabinets is a cutout in said door of an associated cabinet of said storage cabinets.

41. The cart of claim 1, wherein said seven circular-shaped recesses of said plurality of recesses in said upper surface of said base of said frame overlap adjacent circular-shaped recesses of said plurality of recesses in said upper surface of said base of said frame by 50% so as to receive one to four high pressure gas tanks in twenty-nine different configurations.

42. The cart of claim 1, wherein said storage cabinets comprise eight loops extending rearwardly therefrom.

43. The cart of claim 42, wherein said eight loops of said storage cabinets are spaced-apart an amount that allows each adjacent pair of loops of said storage cabinets to straddle a respective high pressure gas tank.

44. The cart of claim 42, wherein said storage cabinets comprise one to five straps.

45. The cart of claim 44, wherein each of said one to five straps of said storage cabinets extends through an adjacent pair of loops of said storage cabinets and captures an associated high pressure gas tank.

* * * * *